US012489635B2

(12) United States Patent
Small et al.

(10) Patent No.: US 12,489,635 B2
(45) Date of Patent: Dec. 2, 2025

(54) SYSTEMS AND METHODS FOR PASSWORDLESS LOGON

(71) Applicant: Cisco Technology, Inc., San Jose, CA (US)

(72) Inventors: Robert Jacob Linial Small, Ann Arbor, MI (US); Jonathan E. T. Means, Ypsilanti, MI (US); Philip Darin Lowman, Troy, MI (US); Glenn J. Stempeck, Livonia, MI (US); Jordan David Neidlinger, Saline, MI (US); Raven Shiao Stewart, Austin, TX (US); Shanieke Adreanna Walters-Pierre, Brooklyn, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 96 days.

(21) Appl. No.: 18/592,679

(22) Filed: Mar. 1, 2024

(65) Prior Publication Data

US 2025/0279894 A1  Sep. 4, 2025

(51) Int. Cl.
*H04L 29/06* (2006.01)
*H04L 9/32* (2006.01)

(52) U.S. Cl.
CPC .................. *H04L 9/3231* (2013.01)

(58) Field of Classification Search
CPC .................................................. H04L 9/3231
See application file for complete search history.

(56) References Cited

U.S. PATENT DOCUMENTS

| 2015/0172920 | A1* | 6/2015 | Ben Ayed | H04W 12/63 |
| | | | | 713/172 |
| 2017/0250974 | A1* | 8/2017 | Antonyraj | H04W 12/50 |
| 2018/0139199 | A1* | 5/2018 | Ahuja | H04L 67/306 |
| 2019/0074972 | A1* | 3/2019 | Shastri | H04L 9/00 |
| 2022/0070160 | A1 | 3/2022 | Cicchitto | |
| 2025/0071112 | A1* | 2/2025 | Al-Saggaf | H04L 63/0861 |

OTHER PUBLICATIONS

Cyberark: "Passwordless Authentication", 2023, 5 Pages.

* cited by examiner

*Primary Examiner* — Evans Desrosiers
(74) *Attorney, Agent, or Firm* — Baker Botts L.L.P.

(57) ABSTRACT

In one embodiment, a method receives a secret and a passwordless login request using a credential provider of the client device. The method pairs the credential provider of the client device with a trusted platform module (TPM) associated with a computing device. The method encrypts, using the TPM of the computing device, the secret with a hardware-bound key associated with the computing device. The method receives, from the client device, a push notification associated with the passwordless login request. The method obtains, from the client device, biometric authentication data and a nonce encrypted with a public key. The method validates a proximity of the biometric authentication data and determine a decrypted nonce by decrypting the nonce using a private key associated with the client device. The method validates the decrypted nonce with the secret. In response to determining the decrypted nonce is valid, the method approves the passwordless login request.

20 Claims, 6 Drawing Sheets

SYSTEMS AND METHODS FOR PASSWORDLESS LOGON

TECHNICAL FIELD

The present disclosure relates generally to an apparatus and method for a secure auto logon to an operating system with a mobile device, and in particular, using the secure auto logon to provide a mobile/roaming passwordless authenticator to support multi-factor authentication (MFA).

BACKGROUND

Electronic computing systems, such as mobile computing devices or servers, provide many useful and powerful services to improve business for companies and personal life for individuals. In recent years, electronic computing systems have implemented complex software components to effectively exchange data amongst a large number of nodes (e.g., clients, mobile computing devices, servers, etc.) within a network using various gateways (e.g., routers, etc.) and communications protocols. For example, electronic computing systems may implement a bring-your-own-device (BYOD) security system to boost work productivity and flexibility. Thus, the BYOD security system may allow users to use their own personal devices to connect to the company's network to access work-related systems. The BYOD security system is particularly susceptible to a cybersecurity attack associated with security breaches, data exfiltration, identity theft, fraud, and/or other types of unauthorized access to such communications. As a result, the number of cybersecurity attacks associated with electronic computing systems also significantly increases.

Cybersecurity attacks often duplicate/clone a website or attempt to drop malware to compromise and steal protected data and assets, such as personal or confidential information, associated with an account or service from a phished victim. Thus, users are reluctant to provide their credentials without being sure that the recipient is a reliable access management system which authenticates the source of credentials. Passwords have been an accepted authentication method for authenticating users and providing access. For example, the access management system may use a password-based authentication method to receive credentials (e.g., username and password) of the users in order to confirm their entity to enable the user operating a client system to access a resource. Only when the received credentials match the stored credentials in the access management system, the users are only granted access. However, the password-based authentication method has some issues related to cybersecurity. The password-based authentication method is not scalable, leading to complications for users and administrators. For example, the users may forget their passwords or make it easy enough to guess. As another example, users may unintentionally reveal their login information by falling for social engineering or phishing scams.

In order to prevent a malicious entity from gaining access to the protected data and assets, cybersecurity infrastructure is critical for detecting, identifying, tracing, and analyzing each critical component or service that is incorporated into one or more high-risk components of the electronic computing devices. For example, electronic computing systems may use primary authentication or multi-factor authentication (MFA) to mitigate traditional phishing attacks by adding an extra layer of protection required to access the account or service. As another example, electronic computing systems may use a threat protection solution to mitigate cases where phishing drops malware to compromise the machine.

Web Authentication (Web Authn) is a passwordless application programming interface (API) authentication protocol, which is a proposed standard by the World Wide Web Consortium (W3C) to stop one or more AITM attacks. In some embodiments, WebAuthn includes an API which allows a mobile server to register and authenticate an end user using public key cryptography rather than a password. In particular, WebAuthn may be configured to generate a credential using a private-public key pair for a website. Thus, WebAuthn may be used to verify a website which the end user is logging into is the correct website. Likewise, WebAuthn may work within a web browser to register, manage, and authenticate users. However, WebAuthn adoption is very low due to poor user experiences caused by inconsistent security settings for different websites. For example, the WebAuthn protocol is not supported by Opera, Linux, Internet Explorer, Webviews, and older versions of other major web browsers.

AITM attacks are a type of unauthorized access for a cyberattack where an attacker secretly relays and possibly alters the communications between two parties who believe that they are directly communicating with each other, as the attacker has inserted themselves between the two parties. For example, a node or other agent redirects or otherwise intercepts communications between two other nodes within the computing environment. Such AITM attacks can go unnoticed for long periods of time which, in turn, allows the attackers to obtain sensitive and damaging information such as payment credentials and the like. As another example, an AITM attacker sends a link to a phishing site to a true end user to steal sensitive credentials and bypass traditional security measures, such as the primary authentication or multiple-factor authentication, because the true end-user authenticates against a fake login page in the phishing site, instead of a valid site.

DESCRIPTION OF EXAMPLE EMBODIMENTS

Overview

Figure 1:
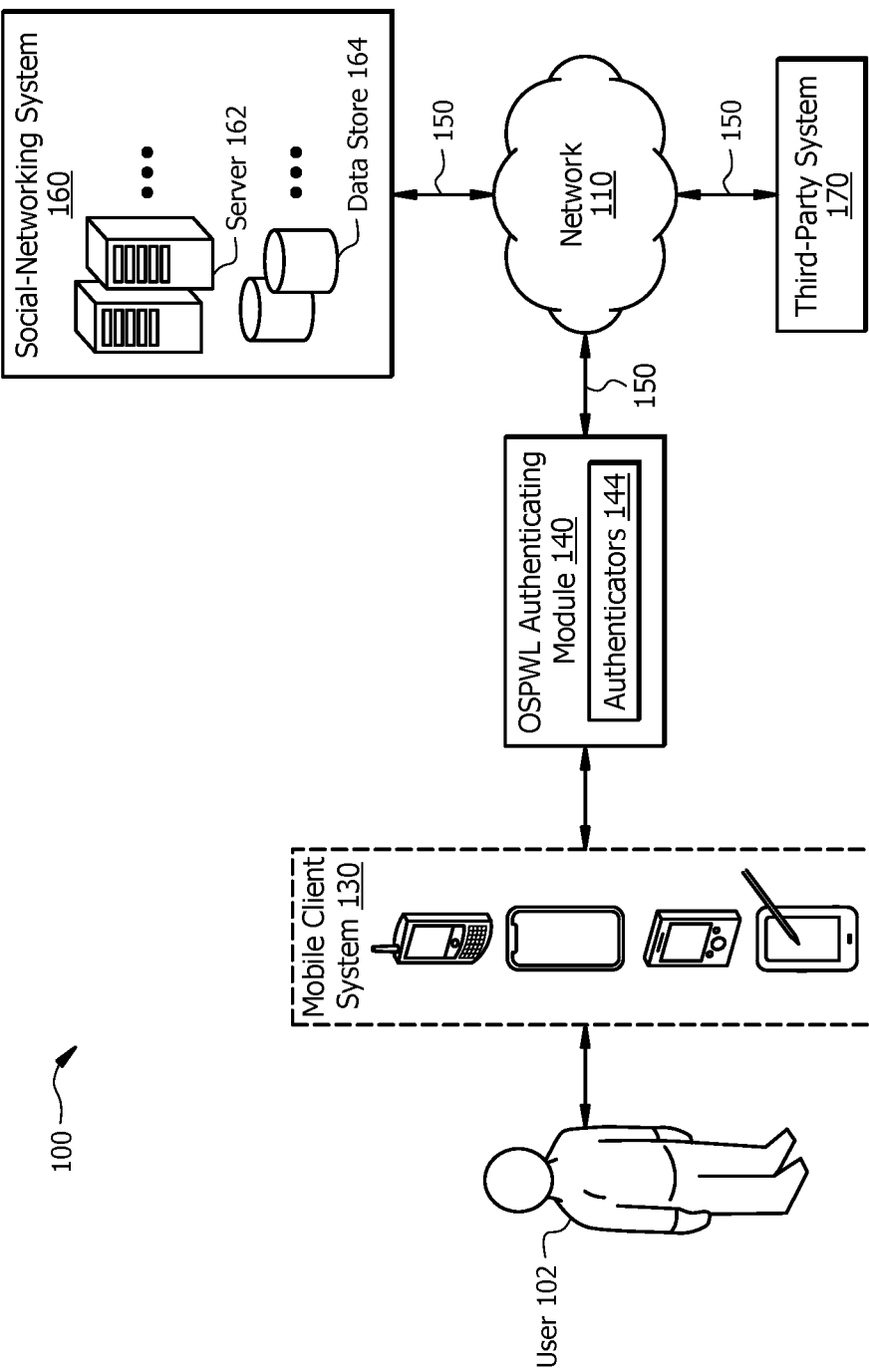
FIG. 1 illustrates an example network environment system associated with a client system for use in a product, in accordance with certain embodiments.

In one or more embodiments, an apparatus may include one or more processors and one or more computer-readable non-transitory storage media comprising instructions that, when executed by the one or more processors, cause one or more components of the apparatus to perform operations. The operations include receiving, from a client device, a secret and a passwordless login request using a credential provider of the client device. The operations further include pairing the credential provider of the client device with a trusted platform module (TPM) associated with a computing device. The operations further include encrypting, using the TPM of the computing device, the secret with a hardware-bound key associated with the computing device. The operations further include receiving, from the client device, a push notification associated with the passwordless login request. The operations further include obtaining, from the client device, biometric authentication data and a nonce encrypted with a public key associated with the client device. The operations further include validating a proximity of the biometric authentication data from the client device. The operations further include determining a decrypted nonce by decrypting the nonce using a private key associated with client device. The operations further include validating the decrypted nonce with the secret. In response to determining that the decrypted nonce is valid, the operations further include approving the passwordless login request. In response to determining the decrypted nonce is invalid, the operations further include rejecting the passwordless login request.

In one or more embodiments, the operations further include receiving, from the credential provider, an advertisement to determine the proximity of the client device. The operations further include determining, using Bluetooth Low Energy (BLE), the proximity of the client device using the advertisement. In response to determining that the proximity of the client device is valid, the operations further include validating the decrypted nonce. In response to determining that the proximity of the client device is invalid, the operations further include rejecting the passwordless login request. The operations further include storing the secret on the computing device, wherein the secret comprises a username and a login password. The operations further include obtaining, using the client device, the biometric authentication data by performing multi-factor authentication (MFA). In response to determining the decrypted nonce is valid, the operations further include releasing the secret to the credential provider and determining, using the credential provider, an autofill password by decrypting the secret. The operations further include validating the biometric authentication data using Transport Layer Security (TLS), certificate pinning, and request signing. In response to determining the biometric authentication data is invalid, the operations further include rejecting the passwordless login request.

In one or more embodiments, a computer-implemented method, by an apparatus, may include receiving, from a client device, a secret and a passwordless login request using a credential provider of the client device. The computer-implemented method further includes pairing the credential provider of the client device with a trusted platform module (TPM) associated with a computing device. The computer-implemented method further includes encrypting, using the TPM of the computing device, the secret with a hardware-bound key associated with the computing device. The computer-implemented method further includes receiving, from the client device, a push notification associated with the passwordless login request. The computer-implemented method further includes obtaining, from the client device, biometric authentication data and a nonce encrypted with a public key associated with the client device. The computer-implemented method further includes validating a proximity of the biometric authentication data from the client device. The computer-implemented method further includes determining a decrypted nonce by decrypting the nonce using a private key associated with client device. The computer-implemented method further includes validating the decrypted nonce with the secret. In response to determining that the decrypted nonce is valid, the computer-implemented method further includes approving the passwordless login request. In response to determining the decrypted nonce is invalid, the computer-implemented method further includes rejecting the passwordless login request.

In one or more embodiments, the computer-implemented method further includes receiving, from the credential provider, an advertisement to determine the proximity of the client device. The computer-implemented method further includes determining, using Bluetooth Low Energy (BLE), the proximity of the client device using the advertisement. In response to determining that the proximity of the client device is valid, the computer-implemented method further includes validating the decrypted nonce. In response to determining that the proximity of the client device is invalid, the computer-implemented method further includes rejecting the passwordless login request. The computer-implemented method further includes storing the secret on the computing device, wherein the secret comprises a username and a login password. The computer-implemented method further includes obtaining, using the client device, the biometric authentication data by performing multi-factor authentication (MFA). In response to determining the decrypted nonce is valid, the computer-implemented method further includes releasing the secret to the credential provider and determining, using the credential provider, an autofill password by decrypting the secret. The computer-implemented method further includes validating the biometric authentication data using Transport Layer Security (TLS), certificate pinning, and request signing. In response to determining the biometric authentication data is invalid, the computer-implemented method further includes rejecting the passwordless login request.

In one or more embodiments, a non-transitory computer-readable medium may include instructions that are configured, when executed by a processor, to perform operations. The operations include receiving, from a client device, a secret and a passwordless login request using a credential provider of the client device. The operations further include pairing the credential provider of the client device with a trusted platform module (TPM) associated with a computing device. The operations further include encrypting, using the TPM of the computing device, the secret with a hardware-bound key associated with the computing device. The operations further include receiving, from the client device, a push notification associated with the passwordless login request. The operations further include obtaining, from the client device, biometric authentication data and a nonce encrypted with a public key associated with the client device. The operations further include validating a proximity of the biometric authentication data from the client device. The operations further include determining a decrypted nonce by decrypting the nonce using a private key associated with the client device. The operations further include validating the decrypted nonce with the secret. In response to determining that the decrypted nonce is valid, the operations further include approving the passwordless login request. In response to determining the decrypted nonce is invalid, the operations further include rejecting the passwordless login request.

In one or more embodiments, the operations further include receiving, from the credential provider, an advertisement to determine the proximity of the client device. The operations further include determining, using Bluetooth Low Energy (BLE), the proximity of the client device using the advertisement. In response to determining that the proximity of the client device is valid, the operations further include validating the decrypted nonce. In response to determining that the proximity of the client device is invalid, the operations further include rejecting the passwordless login request. The operations further include storing the secret on the computing device, wherein the secret comprises a username and a login password. The operations further include obtaining, using the client device, the biometric authentication data by performing multi-factor authentication (MFA). In response to determining the decrypted nonce is valid, the operations further include releasing the secret to the credential provider and determining, using the credential provider, an autofill password by decrypting the secret.

Technical advantages of certain embodiments of this disclosure may include one or more of the following. Certain apparatuses and methods described herein may include an access control system to perform passwordless authentication during login to an operating system. The access control system may implement an operating system logon passwordless (OSPWL) authenticating module to combine proximity checking, a biometric push approval, a hardware-bound strong encryption and shared nonce secret to access and decrypt the original secret. Thus, the access control system may provide a secure auto logon to the operating system without needing to type a password. Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In certain embodiments, authentication is a key tool at the center of cybersecurity infrastructure against various cybersecurity attacks, such as phishing, associated with an electronic computing system. In particular, the electronic computing system may be a mobile device, a server, a personal computer, a laptop computer, a cellular telephone, a smartphone, a tablet computer, or an augmented/virtual reality device. Traditional authentication methods may perform a multi-factor authentication (MFA) process to adequately safeguard one or more digital assets. For every new session, a user begins on a website to access a server, the user needs to undergo the MFA process which exchanges and validates a plurality of Secure Sockets Layer (SSL)/Transport Layer Security (TLS) certificates. SSL/TLS is a protocol or communication rule that allows two or more computer systems, such as the electronic computing system and the server, to talk to each other on the internet safely. SSL/TLS certification may act as digital identity cards which allow the electronic computing system to verify the identity and subsequently establish an encrypted network connection to the server using an SSL/TLS protocol. However, AITM phishing attacks work against the MFA process. For example, AITM attacks may be performed by a malicious actor in order to get an end user to authenticate against a phishing site, instead of the valid site. AITM attacks are usually associated with suboptimal implementations of SSL/TLS certificates. Thus, the malicious actor may alter an Internet Protocol (IP) address of a website, email address, or device and spoof the entity in order to make the end user think he/she is interacting with a trusted source when he/she is actually passing information to the malicious actor.

In some embodiment, an operating system logon passwordless (OSPWL) system is developed for an improved security and user experience perspective. The electronic computing system may be configured to implement the OSPWL system for a secure passwordless authentication during login to an operating system (OS). Therefore, the OSPWL system may operate to provide a mobile and roaming authenticator to support the MFA process in a secure and frictionless passwordless experience during OS logon. In certain embodiments, Web Authentication (WebAuthn) is a passwordless application programming interface (API) authentication protocol that works within a web browser to register, manage, and authenticate users. In some embodiments, WebAuthn includes an API which allows a mobile server to register and authenticate an end user using public key cryptography rather than a password. WebAuthn may be configured to generate a credential using a private-public key pair for a website. The public key is associated with the end user's account. Thus, the public key is sent to the mobile server and the private key remains stored on the end user's authentication device. For example, WebAuthn may support certain platforms (e.g., Window 10 and Android), browsers (e.g., Microsoft Edge, Google Chrome, Mozilla Firefox, and Apple Safari), and authenticator transports (e.g., Universal Serial Bus (USB), Bluetooth Low Energy (BLE), and Near Field Communications (NFC)). Thus, Web Authn may be used to verify a website which the end user is logging into is the correct website. When the end user tries to connect to the mobile service, the OSPWL system may operate to first identify the end user using a login. The OSPWL system then receives the nonce (or challenge) which is encrypted with a public key and sends the encrypted nonce back to the mobile service. The mobile service may then use the private key to decrypt the nonce and provide the decrypted nonce back up to the mobile service to verify whether the decrypted nonce is signed by the end user's secret.

In certain embodiments, the OSPWL system may be configured to provide a secure auto logon to a server, such as a desktop, without needing to type a password by using a plurality of conditions by combining proximity checking, a biometric push approval, a hardware-bound strong encryption and share nonce secret to access and decrypt the original secret. The OSPWL system may receive a secret, such as a password, and a passwordless login request from a user after the electronic computing system successfully authenticates the user's request to access the OS of the server. Upon receiving the secret and the passwordless login request, the OSPWL system may be configured to encrypt the secret with a hardware-bound key associated with the server and share the encrypted secret with the server. Likewise, the OSPWL system may use a biometric push approval from the user to receive a nonce secret which is encrypted with the public key associated with the OSPWL system to be validated for every new session when the user begins on a website to access the server. The OSPWL system may share the nonce secret to access and decrypt the nonce secret with a private key associated with the OSPWL system. Furthermore, the OSPWL system may be configured to verify the proximity of the electronic computing system using BLE by determining whether the electronic computing system is co-located with or is the same device as a credential or a device approving the authentication in order to protect against AITM attacks. In response to determining that the plurality of conditions are valid, the OSPWL system may approve the passwordless login request. In other situations, the mobile application may reject the passwordless login request. Thus, the OSPWL system may be implemented to automate the passwordless authentication in a secure auto logon to the server.

FIG. 1 illustrates an example network environment system 100 associated with a mobile client system 130 for use in a product, in accordance with certain embodiments. Network environment 100 includes a user 102, a mobile client system 130, an OSPWL authenticating module 140, a social-networking system 160, and a third-party system 170 connected to each other by a network 110. Although FIG. 1 illustrates a particular arrangement of user 102, mobile client system 130, OSPWL authenticating module 140, social-networking system 160, third-party system 170, and network 110, this disclosure contemplates any suitable arrangement of user 102, mobile client system 130, OSPWL authenticating module 140, social-networking system 160, third-party system 170, and network 110. As an example and not by way of limitation, two or more of user 102, mobile client system 130, OSPWL authenticating module 140, social-networking system 160, and third-party system 170 may be connected to each other directly, bypassing network 110. As another example, two or more of user 102, mobile client system 130, OSPWL authenticating module 140, social-networking system 160, and third-party system 170 may be physically or logically co-located with each other in whole or in part. Moreover, although FIG. 1 illustrates a particular number of mobile client systems 130, OSPWL authenticating module 140, social-networking systems 160, third-party systems 170, and networks 110, this disclosure contemplates any suitable number of mobile client systems 130, OSPWL authenticating module 140, social-networking systems 160, third-party systems 170, and networks 110. As an example and not by way of limitation, network environment 100 may include multiple users 102, mobile client systems 130, OSPWL authenticating modules 140, social-networking systems 160, third-party systems 170, and networks 110.

In particular embodiments, user 102 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 102 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 160 through blocking, data hashing, anonymization, or other suitable techniques as appropriate. In particular embodiments, third-party system 170 may be a network-addressable computing system that can host aggregate data, in whole or in part, in a predetermined format or provide a service to user 102. Third-party system 170 may generate, store, receive, and send third-party system data, such as, for example, data in a file that is formatted to facilitate automated processing. Third-party system 170 may be accessed by the other components of network environment 100 either directly or via network 110. In particular embodiments, one or more users 102 may use one or more mobile client systems 130 to send one or more passwordless login requests to OSPWL authenticating modules 140 to access, send data to, and receive data from social-networking system 160 or third-party system 170. Mobile client system 130 may access social-networking system 160 or third-party system 170 directly, via network 110, or via a third-party system. As an example and not by way of limitation, mobile client system 130 may access third-party system 170 via social-networking system 160.

This disclosure contemplates any suitable network 110. Network 110 broadly represents any wireline or wireless network, using any of satellite or terrestrial network links, such as public or private cloud on the Internet, ad hoc networks, local area networks (LANs), metropolitan area networks (MANs), wireless LANs (WLANs), wide area networks (WANs), wireless WANs (WWANs), public switched telephone networks (PSTNs), campus networks, internetworks, cellular telephone networks, or combinations thereof. The network 110 may include or comprise the public internet and networked server computers that implement Web2 and/or Web3 technologies. Network 110 may comprise or support intranets, extranets, or virtual private networks (VPNs). Network 110 may also comprise a public switched telephone network (PSTN) using digital switches and call forwarding gear. Network 110 may also comprise a public switched telephone network (PSTN) using digital switches and call forwarding gear. Network 110 may include one or more networks 110.

Links 150 may connect mobile client system 130, OSPWL authenticating module 140, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, mobile client system 130 may be an electronic device including hardware, software, or embedded logic components or a combination of two or more such components and capable of carrying out the appropriate functionalities implemented or supported by mobile client system 130. In particular, mobile client system 130 may be any suitable computing device, such as, for example, a personal computer, a laptop computer, a cellular telephone, a smartphone, a tablet computer, or an augmented/virtual reality device. As an example and not by way of limitation, a mobile client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable mobile client systems 130. A mobile client system 130 may enable a network user at mobile client system 130 to access network 110. A mobile client system 130 may enable its user to communicate with other users at other client systems 130.

In particular embodiments, OSPWL authenticating module 140 may be a passwordless authentication component of mobile client system 130 which is coupled to network 110. OSPWL authenticating module 140 may be configured to provide an interface between mobile client systems 130 and a verifying computer in social networking system 160. As an example and not by way of limitation, for every new session user 102 begins on a website to access a server 162 in social network system 160, user 102 needs to use one or more web browsers to undergo a passwordless authentication process which exchanges and validates a plurality of SSL/TLS certificates for registration and/or authorization. OSPWL authenticating module 140 may include one or more authenticators 144 to perform one or more secure authentications, such as multi-factor authentication, WebAuthn, etc. In particular, OSPWL authenticating module 140 may be configured to initiate an OS passwordless registration process to register user 102 for OSPWL when user 102 successfully uses MFA to log in social-networking system 160 for the first time. Likewise, for every new session user 102 begins on a website to access server 162 in social network system 160, OSPWL authenticating module 140 may be configured to initiate an OS passwordless authorization process to approve one or more login requests to log into server 162 in social network system 160 without needing to type a password.

In particular embodiments, OSPWL authenticating module 140 may be configured to receive a secret, such as a password, and a passwordless login request from user 102 to access server 162 in the OS passwordless registration process. OSPWL authenticating module 140 may be configured to encrypt the secret with a hardware-bound key associated with server 162. The hardware-bound key associated with server 162 may be stored in secure hardware via a trusted platform module (TPM) of server 162. Thus, the correct hardware-bound key, which never leaves server 162, may be used to validate a decrypted nonce for the passwordless login request to log into server 162.

In particular embodiments, OSPWL authenticating module 140 may be configured to origin bind the passwordless login request to prevent AITM attacks. OSPWL authenticating module 140 may enable a credential at mobile client system 130 to respond to a passwordless login request to access a website from a trusted domain. OSPWL authenticating module 140 may enable a network user at mobile client system 130 to access the website by performing a proximity check using BLE to prove that mobile client system 130 is co-located with or the same device as the credential approving the authentication. For example, OSPWL authenticating module 140 may generate a biometric push notification to determine a BLE advertisement which comes from the credential approving the authentication. For the BLE advertisement, OSPWL authenticating module 140 may be configured to release a nonce secret to be decrypted and validated using the stored encrypted secret for server 162. In response to determining the decrypted nonce secret is valid, OSPWL authenticating module 140 may approve the passwordless login request and autofill the password using the decrypted nonce secret.

In particular embodiments, OSPWL authenticating module 140 may include one or more web browsers and may have one or more add-ons, plug-ins, or other extensions. A user at mobile client system 130 may enter a Uniform Resource Locator (URL) or other address directing the one or more web browsers to a particular server (such as server 162, or a server associated with a third-party system 170), and the one or more web browsers may generate a Hyper Text Transfer Protocol (HTTP) request and communicate the HTTP request to the server. The server may accept the HTTP request and communicate to mobile client system 130 one or more Hyper Text Markup Language (HTML) files responsive to the HTTP request. OSPWL authenticating module 140 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, mobile client system 130 may access social-networking system 160 using one or more web browsers, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple data centers. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a mobile client system 130, an OSPWL authenticating module 140, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take action on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a mobile client system 130. As an example and not by way of limitation, content objects may include information regarding things or activities of interest to the user, such as, for example, movie show times, movie reviews, restaurant reviews, restaurant menus, product information, and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a mobile client system 130. Posts may include data such as status updates or other textual data, location information, photos, videos, links, music, or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more mobile client systems 130 or one or more third-party system 170 via network 110. The web server may include a mail server or other messaging functionality for receiving and routing messages between social-networking system 160 and one or more mobile client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a mobile client system 130. Information may be pushed to a mobile client system 130 as notifications, or information may be pulled from mobile client system 130 responsive to a request received from mobile client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from mobile client systems 130 associated with users. Advertisement-pricing modules may combine social information, the current time, location information, or other suitable information to provide relevant advertisements in the form of notifications to a user.

Although FIG. 1 illustrates a particular number of users 102, networks 110, mobile client systems 130, OSPWL authenticating modules 140, authenticators 144, links 150, social-networking systems 160, servers 162, data stores 164, and third-party systems 170, this disclosure contemplates any suitable number of users 102, networks 110, mobile client systems 130, OSPWL authenticating modules 140, authenticators 144, links 150, social-networking systems 160, servers 162, data stores 164, and third-party systems 170. For example, user 102 may use one or more mobile client systems 130 to access resources from one or more servers 162.

Although FIG. 1 illustrates a particular arrangement of user 102, network 110, mobile client systems 130, OSPWL authenticating module 140, authenticator 144, link 150, social-networking system 160, server 162, data store 164, third-party system 170, this disclosure contemplates any suitable arrangement of user 102, network 110, mobile client systems 130, OSPWL authenticating module 140, authenticator 144, link 150, social-networking system 160, server 162, data store 164, third-party system 170.

Although FIG. 1 describes and illustrates particular components, devices, or systems carrying out particular actions, this disclosure contemplates any suitable combination of any suitable components, devices, or systems carrying out any suitable actions. For example, user 102 may use one or more mobile client systems 130 to access resources from one or more servers 162.

Figure 2:
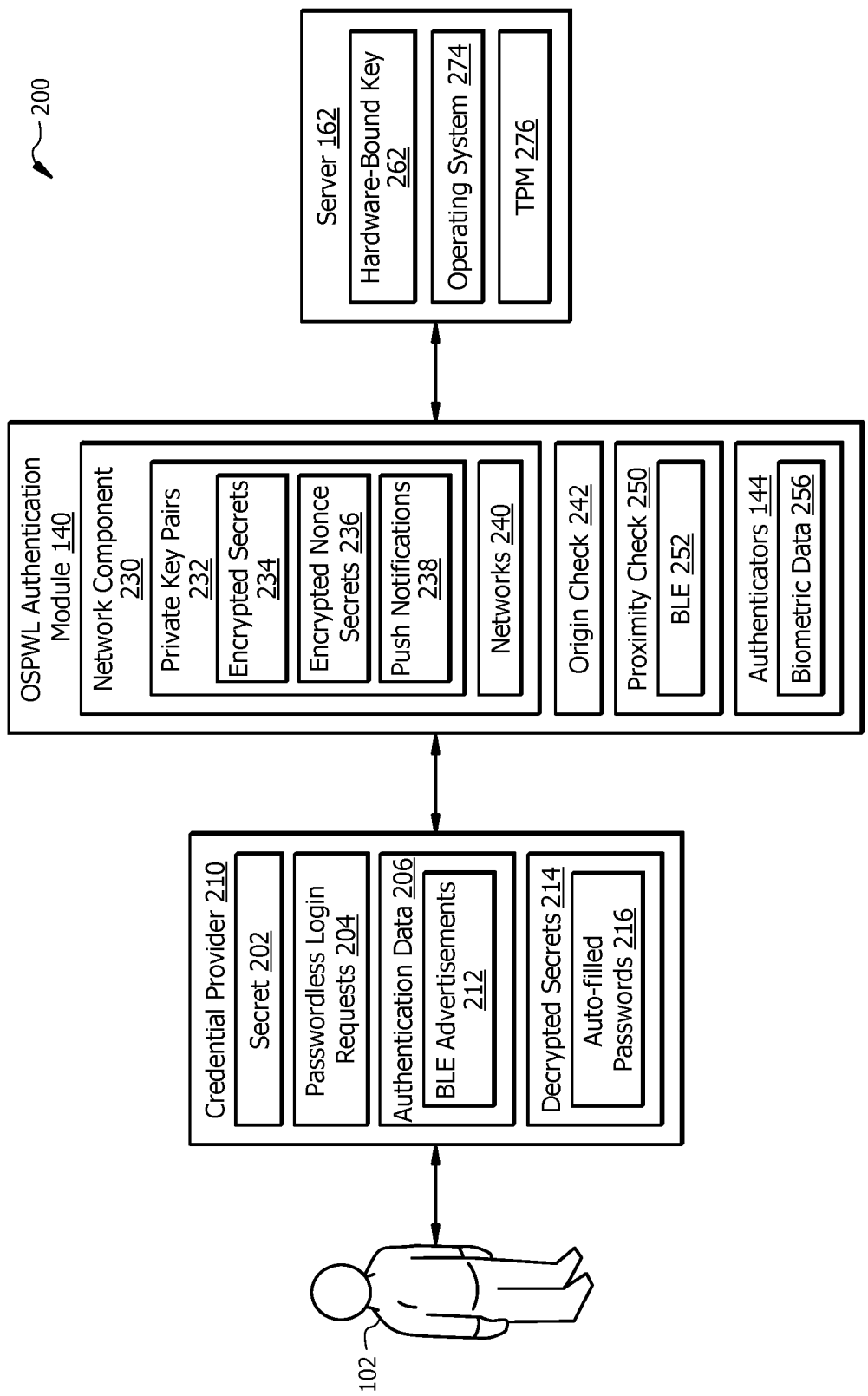
FIG. 2 illustrates an example access control system with an OSPWL authenticating module, in accordance with certain embodiments.

FIG. 2 illustrates an example access control system 200 with an OSPWL authenticating module 140 for a mobile client device, in accordance with certain embodiments. In some embodiments, access control system 200 may include user 102, credential provider 210, OSPWL authenticating module 140, and server 162. In some embodiments, credential provider 210 may include an interactive, browser-based authentication interface. In particular, credential provider 210 may be programmed to use one or more web browsers to receive secret 202 and a first passwordless login request 204 to access an operating system 274 of server 162 to initiate a registration process for OSPWL. OSPWL authenticating module 140 may be programmed to perform a plurality of operations to determine a plurality of conditions associated with the first passwordless request 204. The plurality of conditions include a proximity validation, a biometric push approval, a hardware-bound strong encryption and shared nonce secret to access and decrypt the original secret. When the plurality of conditions are valid, OSPWL authenticating module 140 may approve the first passwordless login request 204. Likewise, for every new session when user 102 begins on a website to access operating system 274 of server 162, OSPWL authenticating module 140 may be programmed to receive a second passwordless login request 204 which triggers an OS passwordless authentication process to determine a nonce secret for authentication based on the original secret. During the OS passwordless authentication process, OSPWL authenticating module 140 may be programmed to evaluate the plurality of conditions associated with the second passwordless request 204. When the plurality of conditions are still valid, OSPWL authenticating module 140 may allow user 102 to log in to operating system 274 of server 162.

In some embodiments, credential provider 210 may be programmed to receive secret 202 and the first passwordless login request 204 from user 102 in the OS passwordless registration process. Secret 202 may include an original secret of necessary access credentials, such as username and password, associated with user 102 when user 102 successfully logs in to operating system 274 of server 162 for the first time. Server 162 may be a computing device which includes one or more resources which user 102 attempts to access. In particular, credential provider 210 may be coupled to OSPWL authenticating module 140 to perform MFA to authenticate secret 202 to get into operating system 274 of server 162. In response to successfully authenticating secret 202, OSPWL authenticating module 140 may be programmed to continue to process the first passwordless login request 204 for user 102. For example, credential provider 210 may be paired with a trusted platform module (TPM) 276 associated with server 162 to generate a private key pair 232. Thus, credential provider 210 may be programmed to access a hardware-bound key 262 associated with server 162 and generate an encrypted secret 234 by encrypting secret 202, such as the password, with the hardware-bound key 262 associated with server 162.

In some embodiments, hardware-bound key 262 may authenticate users with phishing-resistant cryptographic keys which provide a high level of assurance. Hardware-bound key 262 may be stored in secure hardware associated with server 162 via TPM 276. Hardware-bound key 262 may be a type of password key where the private key is generated and stored in dedicated hardware, such as TPM 276, and never exposed to software. The processing of the authentication protocol is also performed by the hardware, keeping the private key protected from attackers. Thus, a bad actor may need to log in to server 162 in order to use software to activate the hardware and use the private key to remotely attack sever 162. However, this is a one-time attack, and the bad actor may not authenticate as a user from an arbitrary time or location. Therefore, the hardware protection of hardware-bound key 262 may increase the difficulty of attacks significantly given that attackers would need to execute a local, destructive attack on hardware.

In some embodiments, credential provider 210 may communicate encrypted secret 234 to OSPWL authenticating module 140 to perform the OS passwordless registration process. In some embodiments, OSPWL authenticating module 140 may include a network component 230 to dynamically search for an available and suitable network from a list of prioritized networks 240, and register for service. Thus, OSPWL authenticating module 140 may passively sniff encrypted secret 234 to be decrypted at a later date by passing encrypted secret 234 over the network which uses TLS, certificate pinning, and request signing. For example, OSPWL authenticating module 140 may send a first encrypted nonce to credential provider 210. A nonce is a randomly generated number as a timestamp to keep communications private and protect against replay attacks. In particular, nonce is only used one time in a communication because it is only valid for a specific amount of time. As another example, OSPWL authenticating module 140 may generate a first push notification 238 to an application, such as authenticators 144, of the mobile client device.

In some embodiments, in response to receiving the first encrypted nonce and the first push notification 238, credential provider 210 may be programmed to determine a first encrypted nonce secret 236 using biometric authentication data, such as authentication data 206, from the mobile client device. Likewise, OSPWL authenticating module 140 may be programmed to determine biometric data 256 associated with the first passwordless login request 204 by using authentication data 206 and one or more authenticators 144, such as MFA, WebAuthn, etc. Thus, OSPWL authenticating module 140 may be used to validate the proximity of authentication data 206 from the mobile client device to protect against AITM attacks. For example, OSPWL authenticating module 140 may receive a first BLE advertisement 212 from credential provider 210 to validate the proximity of authenticating data 206 using BLE 252.

In some embodiments, in response to receiving the first BLE advertisement 212, OSPWL authenticating module 140 may be programmed to perform origin check 242 for the first passwordless login request 204. In particular, OSPWL authenticating module 140 may be used to origin bind the first passwordless login request 204 to determine a first verification indication by verifying an origin header of the first passwordless login request 204 matches a plurality of trusted URLs. In some embodiments, OSPWL authenticating module 140 may be programmed to generate an information webpage associated with the first passwordless login request 204 which is served to user 102 to collect a valid user credential, such as authentication data 206, to approve the authentication for the first passwordless login request 204. In particular, an attacker may create a phishing campaign where the victim, such as user 102, successfully logs into a remote service but the attacker may intercept the victim's network and retrieve the user credential in an AITM attack. In order to prevent the AITM attack, OSPWL authenticating module 140 may be used to perform proximity check 250 using BLE 252 to determine a second verification indication by verifying that the mobile client device is co-located or is the same device as the user credential or device approving the authentication. When the first and second verification indications are valid, OSPWL authenticating module 140 may determine a first decrypted nonce secret 214 by decrypting the first encrypted nonce secret 236 using the private key associated with the OSPWL authenticating module 140. Furthermore, OSPWL authenticating module 140 may communicate a biometric push approval via network component 230 to verify the first decrypted nonce secret 214 using the original secret. In response to determining that the first decrypted nonce secret 214 is valid, OSPWL authenticating module 140 may authenticate the first passwordless login request 204 and release encrypted secret 234 via network component 230 to be stored in OSPWL authenticating module 140 for OS passwordless authentication. Therefore, OSPWL authenticating module 140 may provide a secure auto logon to server 162 without needing to type a password by combining proximity checking, a biometric push approval, a hardware-bound strong encryption and shared nonce secret to access and decrypt the original secret.

In some embodiments, for every new session when user 102 begins on a website to access operating system 274 of server 162, OSPWL authenticating module 140 may be programmed to generate a second passwordless login request 204 to initiate an OS passwordless authentication process. For example, OSPWL authenticating module 140 may send a second encrypted nonce to credential provider 210. A nonce is a randomly generated number as a timestamp to keep communications private and protect against replay attacks. In particular, nonce is only used one time in a communication because it is only valid during a specific amount of time. As another example, OSPWL authenticating module 140 may generate a second push notification 238 to an application, such as authenticators 144, of the mobile client device.

In some embodiments, in response to receiving the second encrypted nonce and the second push notification 238, credential provider 210 may be programmed to determine a second encrypted nonce secret 236 using biometric authentication data, such as authentication data 206, from the mobile client device. Likewise, OSPWL authenticating module 140 may be programmed to determine biometric data 256 associated with the second passwordless login request 204 by using authentication data 206 and one or more authenticators 144, such as MFA, WebAuthn, etc. Thus, OSPWL authenticating module 140 may be used to validate the proximity of authentication data 206 from the mobile client device to protect against AITM attacks. For example, OSPWL authenticating module 140 may receive a second BLE advertisement 212 from credential provider 210 to validate the proximity of authenticating data 206 using BLE 252.

In some embodiments, in response to receiving the second BLE advertisement 212, OSPWL authenticating module 140 may be programmed to perform origin check 242 for the second passwordless login request 204. In particular, OSPWL authenticating module 140 may be used to origin bind the second passwordless login request 204 to determine a first verification indication by verifying an origin header of the second passwordless login request 204 matches a plurality of trusted URLs. In some embodiments, OSPWL authenticating module 140 may be programmed to generate an information webpage associated with the second passwordless login request 204 which is served to user 102 to collect a valid user credential, such as authentication data 206, to approve the authentication for the second passwordless login request 204. In particular, an attacker may create a phishing campaign where the victim, such as user 102, successfully logs into a remote service but the attacker may intercept the victim's network and retrieve the user credential in an AITM attack. In order to prevent the AITM attack, OSPWL authenticating module 140 may be used to perform proximity check 250 using BLE 252 to determine a second verification indication by verifying that the mobile client device is co-located or is the same device as the user credential or device approving the authentication. When the first and second verification indications are valid, OSPWL authenticating module 140 may determine a second decrypted nonce secret 214 by decrypting the nonce using a private key associated with the OSPWL authenticating module 140. Furthermore, OSPWL authenticating module 140 may communicate a biometric push approval via network component 230 to verify the decrypted nonce secret 214 using encrypted secret 234. In response to determining that decrypted nonce secret 214 is valid, OSPWL authenticating module 140 may authenticate the second passwordless login request 204 and determine an auto-filled password 216 using decrypted nonce secret 14 for OS passwordless authentication. Therefore, OSPWL authenticating module 140 may provide a secure auto logon to server 162 without needing to type a password by combining proximity checking, a biometric push approval, a hardware-bound strong encryption, and shared nonce secret to access and decrypt the original secret.

Although FIG. 2 illustrates a particular number of users 102, credential providers 210, OSPWL authenticating modules 140, authenticators 144, servers 162, secrets 202, passwordless login requests 204, authentication data 206, BLE advertisements 212, decrypted secrets 214, auto-filled passwords 216, network components 230, private key pairs 232, encrypted secrets 234, encrypted nonce secrets 236, push notifications 238, networks, origin checks 242, proximity checks 250, BLEs 252, biometric data 256, hardware-bound keys, operating systems 274, and TPMs 276, this disclosure contemplates any suitable number of users 102, credential providers 210, OSPWL authenticating modules 140, authenticators 144, servers 162, secrets 202, passwordless login requests 204, authentication data 206, BLE advertisements 212, decrypted secrets 214, auto-filled passwords 216, network components 230, private key pairs 232, encrypted secrets 234, encrypted nonce secrets 236, push notifications 238, networks, origin checks 242, proximity checks 250, BLEs 252, biometric data 256, hardware-bound keys, operating systems 274, and TPMs 276. For example, OSPWL authenticating module 140 may validate one or more passwordless login requests 204 from user 102.

Although FIG. 2 illustrates a particular arrangement of user 102, credential provider 210, OSPWL authenticating module 140, authenticators 144, server 162, secret 202, passwordless login requests 204, authentication data 206, BLE advertisements 212, decrypted secrets 214, auto-filled passwords 216, network component 230, private key pairs 232, encrypted secrets 234, encrypted nonce secrets 236, push notifications 238, networks, origin check 242, proximity check 250, BLE 252, biometric data 256, hardware-bound key, operating system 274, and TPM 276, this disclosure contemplates any suitable arrangement of user 102, credential provider 210, OSPWL authenticating module 140, authenticators 144, server 162, secret 202, passwordless login requests 204, authentication data 206, BLE advertisements 212, decrypted secrets 214, auto-filled passwords 216, network component 230, private key pairs 232, encrypted secrets 234, encrypted nonce secrets 236, push notifications 238, networks, origin check 242, proximity check 250, BLE 252, biometric data 256, hardware-bound key, operating system 274, and TPM 276.

Although FIG. 2 describes and illustrates particular components, devices, or systems carrying out particular actions, this disclosure contemplates any suitable combination of any suitable components, devices, or systems carrying out any suitable actions. For example, OSPWL authenticating module 140 may validate one or more passwordless login requests 204 from user 102.

Figure 3A:
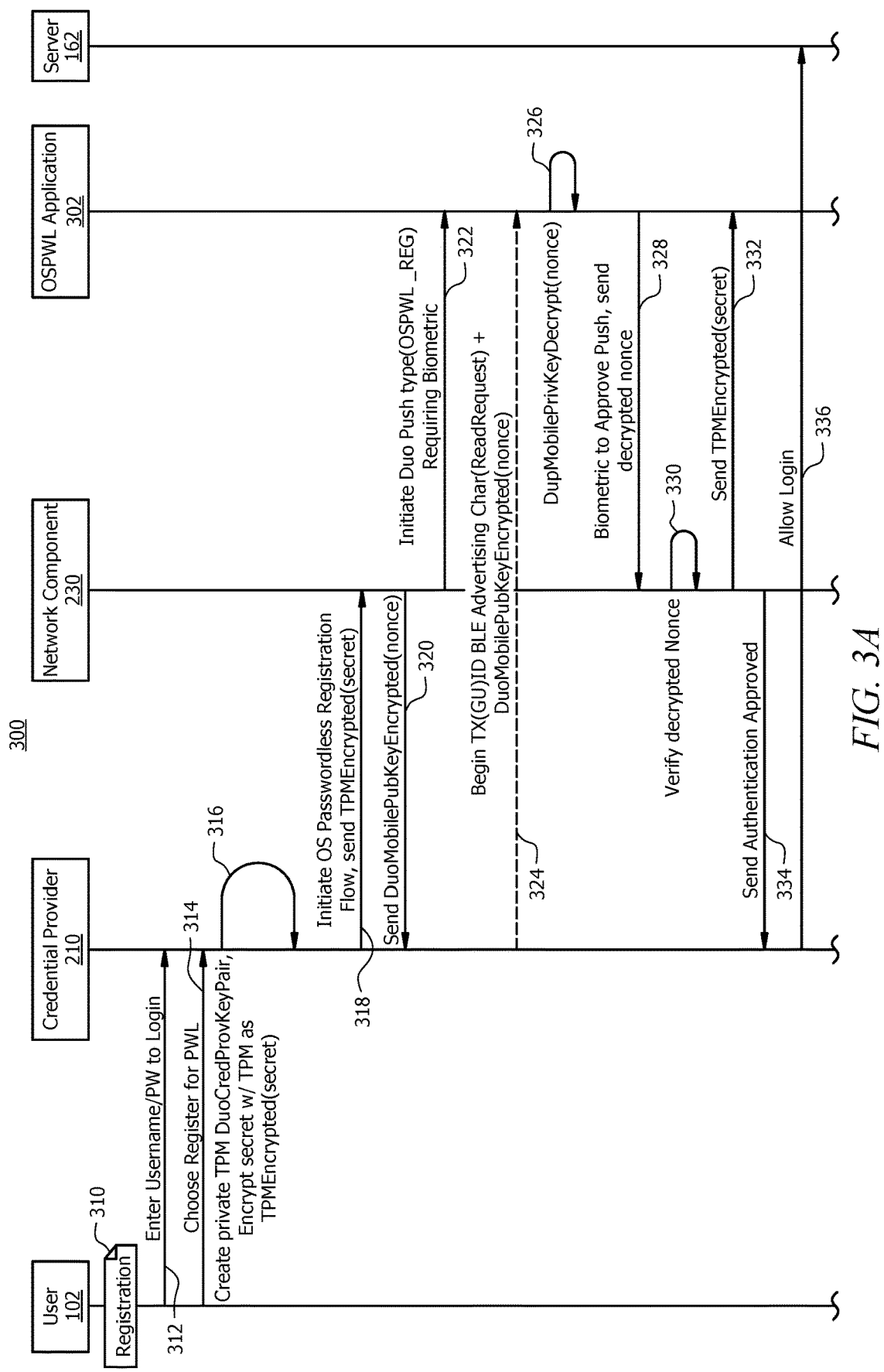
FIGS. 3A and 3B illustrate an example signaling diagram for implementing an access control system with an OSPWL authenticating module, in accordance with certain embodiments.
Figure 3B:
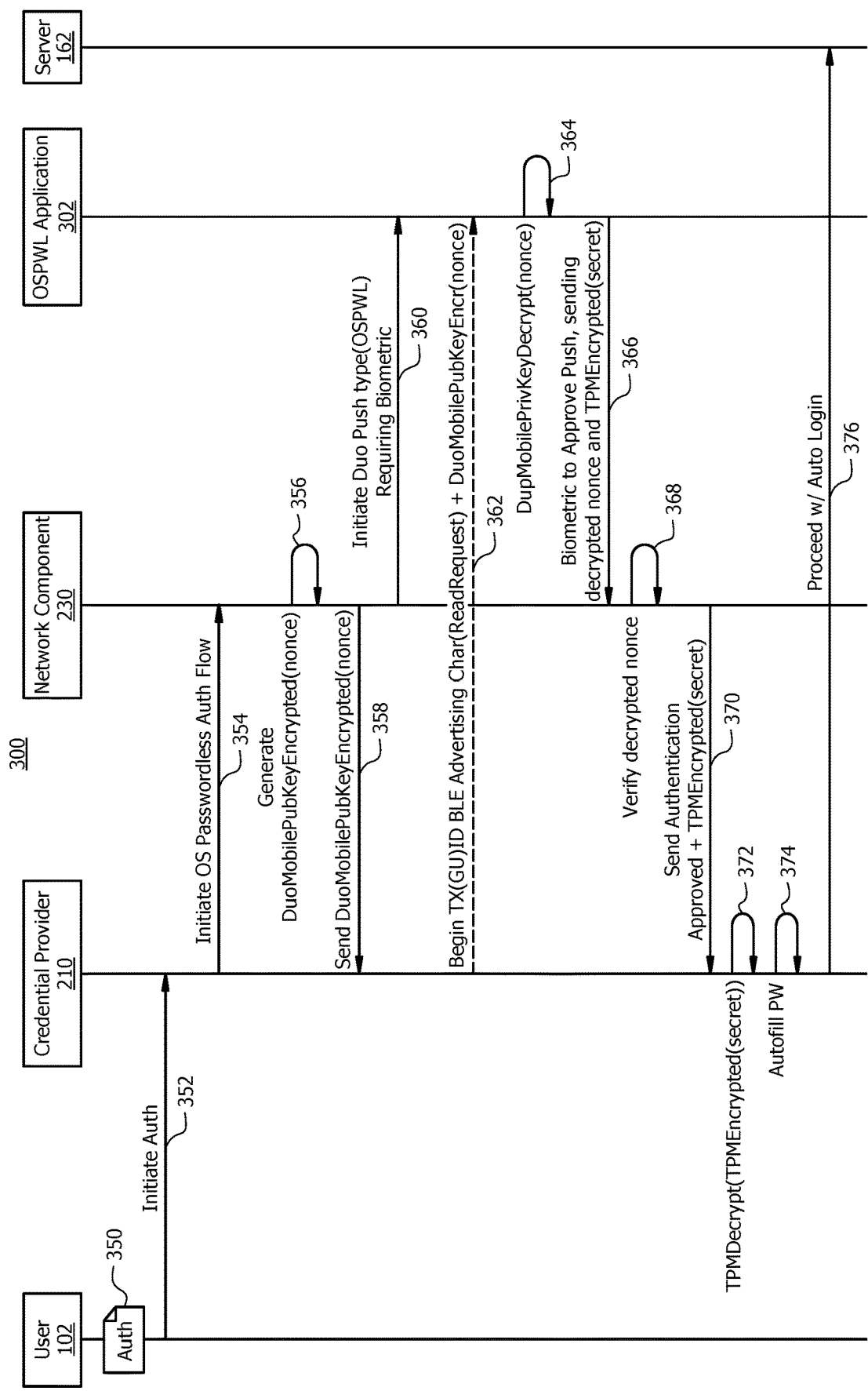

FIGS. 3A and 3B illustrate an example signaling diagram 300 for implementing an access control system with an OSPWL authenticating module, in accordance with certain embodiments. Signaling diagram 300 includes a user 102, a credential provider 210, a network component 230, an OSPWL application 302, and a server 162. User 102 may use a mobile client device in an OS passwordless registration process and/or an OS passwordless authorization process to log in an operating system of sever 162. In particular, the mobile client device may include credential provider 210, network component 230, and an OSPWL application 302 for processing one or more passwordless login requests received during the OS passwordless registration process and/or the OS passwordless authorization process.

In some embodiments, credential provider 210 may include an interactive, browser-based authentication interface. Network component 230 may include a cloud service. Thus, the mobile client device may be used to register, manage, and authenticate users without needing to type a password. In some embodiments, user 102 may use credential provider 210 to generate a signal 310 to an operating system of the mobile client device to initiate the OS passwordless registration process. For example, credential provider 210 may be used to generate a signal 312 to the operating system of the mobile client device to receive one or more credentials, such as username and password, from user 102. As another example, credential provider 210 may be used to generate a signal 314 to the operating system of the mobile client device to receive a first passwordless login request from user 102 to register for OSPWL after successfully authenticating user 102 using MFA. Thus, credential provider 210 may be used to generate a signal 316 to the operating system of the mobile client device to create a private key pair by encrypting a secret, such as the password, with a hardware-bound key stored in a secure hardware of server 162 via TPM. Credential provider 210 may be used to generate a signal 318 to the operating system of the mobile client device to communicate the encrypted secret to network component 230. In response to receiving the encrypted secret, network component 230 may be used to generate a signal 320 to the operating system of the mobile client device to generate an encrypted nonce and send the encrypted nonce to credential provider 210. Furthermore, network component 230 may be used to generate a signal 322 to the operating system of the mobile client device to generate a push notification to initiate OSPWL application 302 to determine biometry data by requiring biometric authentication data from user 102. For example, credential provider 210 may use the one or more web browsers to determine the biometric authentication data using MFA for user 102. As another example, credential provider 210 may use the biometric authentication data to determine a first encrypted nonce secret which includes the encrypted secret. As a result, credential provider 210 may be used to generate a signal 324 to the operating system of the mobile client device to send a first BLE advertisement and the first encrypted nonce secret to OSPWL application 302 to prove proximity using BLE and generate a decrypted nonce secret.

In some embodiments, in response to receiving the first BLE advertisement, OSPWL application 302 may be programmed to perform an origin check for the first passwordless login request. In particular, OSPWL application 302 may be used to origin bind the first passwordless login request to determine a first verification indication by verifying an origin header of the first passwordless login request matches a plurality of trusted URLs. Likewise, OSPWL application 302 may be used to perform a proximity check using BLE to determine a second verification indication by verifying that the mobile client device is co-located or is the same device as the user credential or device approving the authentication. When the first and second verification indications are valid, OSPWL application 302 may be used to generate a signal 326 to the operating system of the mobile client device to determine a first decrypted nonce secret by decrypting the nonce using the private key associated with OSWPL application 302. Furthermore, OSPWL application 302 may be used to generate a signal 328 to the operating system of the mobile client device to communicate a biometric push approval and the first decrypted nonce secret to network component 230 for validation.

In some embodiments, network component 230 may be used to generate a signal 330 to the operating system of the mobile client device to verify the first decrypted nonce secret using the original secret. In response to determining that first decrypted nonce secret is valid, network component 230 may be used to generate a signal 332 to the operating system of the mobile client device to release the encrypted secret which is stored in OSPWL application 302 to be used in the OS passwordless authentication process. Network component 230 may be used to generate a signal 334 to the operating system of the mobile client device to authenticate the first passwordless login request and send authentication approval to credential provider 210. As a result, credential provider 210 may be used to generate a signal 336 to the operating system of the mobile client device to report authentication success to user 102 and allow user 102 to log into the operating system of server 162.

In some embodiments, for every new session when user 102 begins on a website to access the operating system of server 162, user 102 may use credential provider 210 to generate a signal 350 to an operating system of the mobile client device to initiate the OS passwordless authentication process. For example, credential provider 210 may be used to generate a signal 354 to the operating system of the mobile client device to receive a second passwordless login request from user 102. Thus, network component 230 may be used to generate a signal 356 to the operating system of the mobile client device to issue a secret nonce which is only decryptable by OSPWL application 302. Thus, network component 230 may be used to generate a signal 358 to the operating system of the mobile client device to generate an encrypted nonce and send the encrypted nonce to credential provider 210. Furthermore, network component 230 may be used to generate a signal 360 to the operating system of the mobile client device to generate a push notification to initiate OSPWL application 302 to determine biometry data by requiring biometric authentication data from user 102. For example, credential provider 210 may use the one or more web browsers to determine the biometric authentication data using MFA for user 102. As another example, credential provider 210 may use the biometric authentication data to determine a second encrypted nonce secret which includes the encrypted nonce. As a result, credential provider 210 may be used to generate a signal 362 to the operating system of the mobile client device to send a second BLE advertisement and the second encrypted nonce secret to OSPWL application 302 to prove proximity using BLE and generate a second decrypted nonce secret.

In some embodiments, in response to receiving the second BLE advertisement, OSPWL application 302 may be programmed to perform an origin check for the second passwordless login request. In particular, OSPWL application 302 may be used to origin bind the second passwordless login request to determine a first verification indication by verifying an origin header of the second passwordless login request matches the plurality of trusted URLs. Likewise, OSPWL application 302 may be used to perform a proximity check using BLE to determine a second verification indication by verifying that the mobile client device is co-located or is the same device as the user credential or device approving the authentication. When the first and second verification indications are valid, OSPWL application 302 may be used to generate a signal 364 to the operating system of the mobile client device to determine a second decrypted nonce secret by decrypting the nonce using the private key associated with OSPWL application 302. Furthermore, OSPWL application 302 may be used to generate a signal 366 to the operating system of the mobile client device to communicate a biometric push approval and the second decrypted nonce secret to network component 230 for validation.

In some embodiments, network component 230 may be used to generate a signal 368 to the operating system of the mobile client device to verify the second decrypted nonce secret using the encrypted secret. In response to determining that second decrypted nonce secret is valid, network component 230 may be used to generate a signal 370 to the operating system of the mobile client device to authenticate the second passwordless login request and send authentication approval to credential provider 210. Furthermore, credential provider 210 may be used to generate a signal 372 to the operating system of the mobile client device to decrypt the original secret. Thus, credential provider 210 may be used to generate a signal 374 to the operating system of the mobile client device to use the temporary password to determine an auto-filled password by decrypting the encrypted secret. As a result, credential provider 210 may be used to generate a signal 376 to the operating system of the mobile client device to report authentication success to user 102 and allow user 102 to log into the operating system of server 162.

Figure 4:
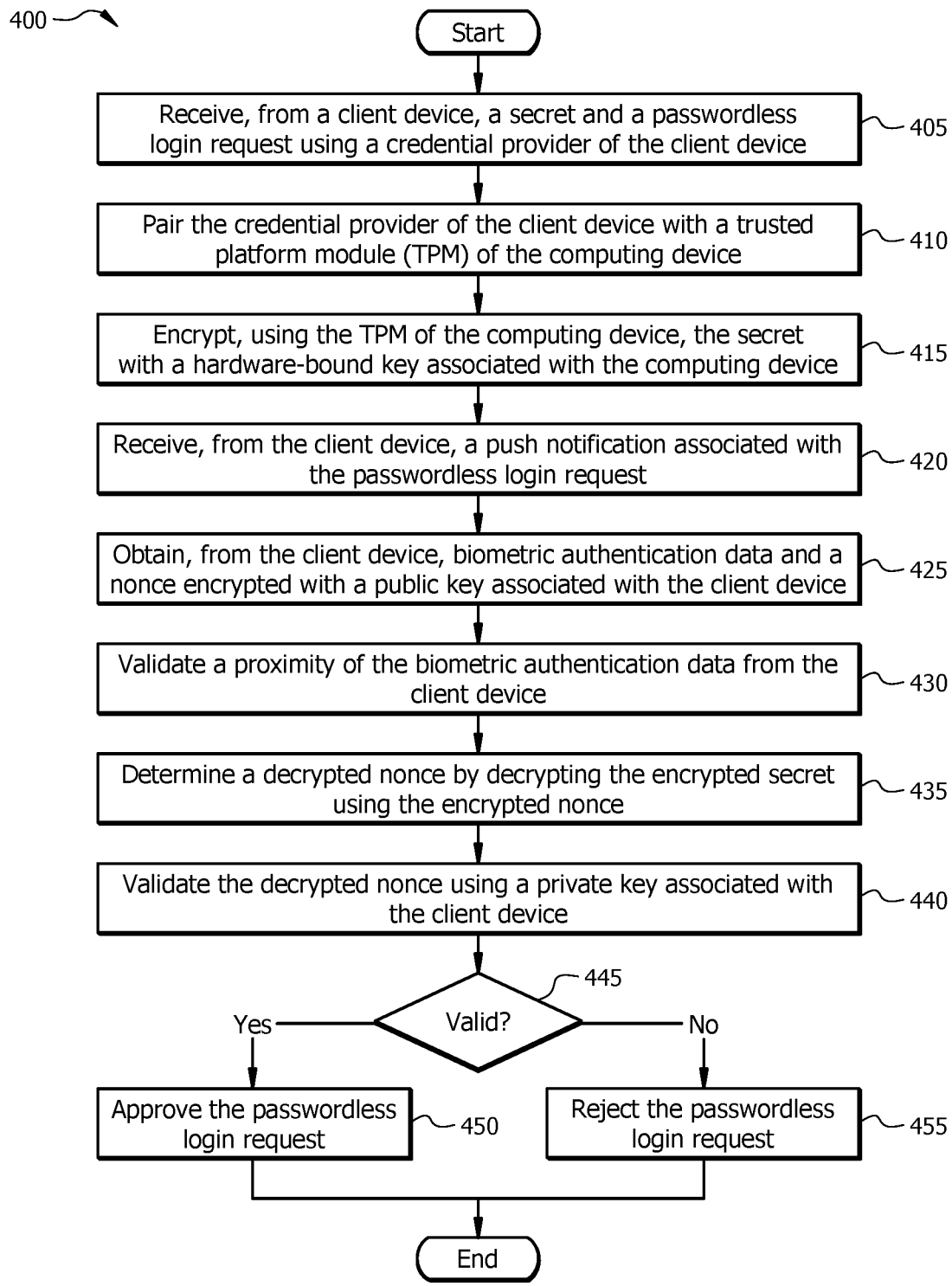
FIG. 4 illustrates an example method for implementing an access control system with an OSPWL authenticating module, in accordance with certain embodiments.

FIG. 4 illustrates an example method 400 for implementing an access control system with an OSPWL authenticating module, in accordance with certain embodiments. Method 400 of FIG. 4 may be used by access control system 200 of FIG. 2. Method 400 starts at step 405, where access control system 200 (referring to FIG. 2) may be programmed to receive, from a client device, a secret and a passwordless login request using a credential provider of the client device. The credential provider may include an interactive, browser-based authentication interface. For example, the credential provider may be used to receive the secret which includes a password from the client device. As another example, the passwordless login request may be generated when registering the client device for OSPWL after successfully authenticating a user.

At step 410, access control system 200 (referring to FIG. 2) may be programmed to pair the credential provider of the client device with a trusted platform module (TPM) of the computing device. A TPM is a microchip which is designed to provide basic security-related functions, primarily involving encryption keys. The TPM which is installed on the motherboard of the computing device may communicate with the rest of the access control system 200 (referring to FIG. 2) by using a hardware bus. Access control system 200 (referring to FIG. 2) may use the OSPWL authenticating module to pair the credential provider with the computing device via TPM.

At step 415, access control system 200 (referring to FIG. 2) may be programmed to encrypt, using the TPM of the computing device, the secret with a hardware-bound key associated with the computing device. The OSPWL authenticating module may be used to access the hardware-bound key stored in secure hardware associated with the computing device via TPM. The hardware-bound key is used to encrypt and decrypt the secret, such as a password, in secret key encryption. For example, the hardware-bound key never leaves the computing device At step 420, access control system 200 (referring to FIG. 2) may be programmed to receive, from the client device, a push notification associated with the passwordless login request. In response to receiving the push notification, the OSPWL authenticating module may be used to identify one or more authenticators, such as MFA, WebAuthn, etc., to require biometric data associated with the passwordless login request.

At step 425, access control system 200 (referring to FIG. 2) may be programmed to obtain, from the client device, biometric authentication data and a nonce encrypted with a public key associated with the client device. For example, the OSPWL authenticating module may be used to use the one or more authenticators, such as MFA, WebAuthn, etc., to require biometric data associated with the passwordless login request.

At step 430, access control system 200 (referring to FIG. 2) may be programmed to validate a proximity of the biometric authentication data from the client device. For example, the OSPWL authenticating module may be used to receive a BLE advertisement from the credential provider to use BLE to perform a proximity check for the biometric data. Thus, the OSPWL authenticating module may be used to verify that the client device is co-located or is the same device as the user credential or device approving the authentication.

At step 435, access control system 200 (referring to FIG. 2) may be programmed to determine a decrypted nonce by decrypting the nonce using a private key associated with the client device.

At step 440, access control system 200 (referring to FIG. 2) may be programmed to validate the decrypted nonce with the secret.

At step 445, a determination is made whether the decrypted nonce is valid. Where the decrypted nonce is valid, the process may proceed to step 450. Where the decrypted nonce is invalid, the process may proceed to step 455. At step 450, access control system 200 (referring to FIG. 2) may approve the passwordless login request. At step 455, access control system 200 (referring to FIG. 2) may reject the passwordless login request.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method to implement an access control system using an OSPWL authenticating module, including the particular steps of the method of FIG. 4, this disclosure contemplates any suitable method including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
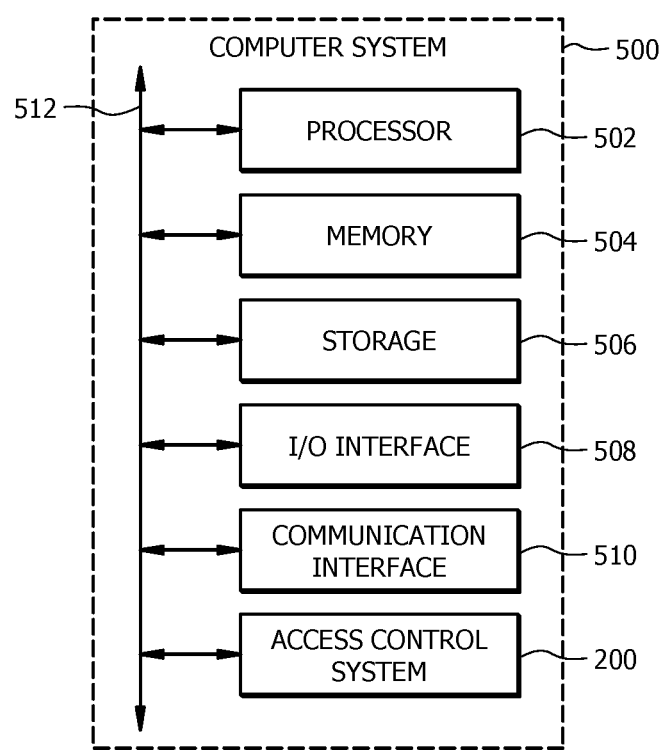
FIG. 5 illustrates an example computer system, in accordance with certain embodiments.

FIG. 5 illustrates an example computer system, in accordance with certain embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to an information handling system may encompass a computer or a computing device, and vice versa, where appropriate. Moreover, reference to an information handling system may encompass one or more computer systems, where appropriate. Further, the request control system in FIG. 2 may be incorporated into the illustrated computer system 500. With reference to the present disclosure, computer system 500 may be the aforementioned product incorporating request control system in FIG. 2, as described above with respect to FIG. 2. As such, "product" and "computer system 500" may herein be used interchangeably.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific Ics (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In an embodiment, computer system 500 may be configured to implement an access control process (see FIG. 2) to register, manage, and authenticate users without needing to type a password. In an embodiment, computer system 500 may be configured to receive, from a client device, a secret and a passwordless login request using a credential provider of the client device. In an embodiment, computer system 500 may be configured to pair the credential provider of the client device with a TPM of the computing device. In an embodiment, computer system 500 may be configured to encrypt, using the TPM of the computing device, the secret with a hardware-bound key associated with the computing device. In an embodiment, computer system 500 may be configured to receive, from the client device, a push notification associated with the passwordless login request. In an embodiment, computer system 500 may be configured to obtain biometric authentication data and a nonce encrypted with a public key associated with the client device. Computer system 500 may be configured to validate a proximity of the biometric authentication data from the client device. In an embodiment, computer system 500 may be configured to determine a decrypted nonce by decrypting the nonce using a private key associated with the client device. In an embodiment, computer system 500 may be configured to validate the decrypted nonce with the secret. In response to determining the decrypted nonce is valid, computer system 500 may be configured to approve the passwordless login request.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

What is claimed is:

1. An apparatus, comprising:
one or more processors; and
one or more computer-readable non-transitory storage media comprising instructions that, when executed by the one or more processors, cause one or more components of the apparatus to perform operations comprising:
receiving, from a client device, a secret and a passwordless login request using a credential provider of the client device;
pairing the credential provider of the client device with a trusted platform module (TPM) associated with a computing device;
encrypting, using the TPM of the computing device, the secret with a hardware-bound key associated with the computing device;
receiving, from the client device, a push notification associated with the passwordless login request;
obtaining, from the client device, biometric authentication data and a nonce encrypted with a public key associated with the client device;
validating a proximity of the biometric authentication data from the client device;

determining a decrypted nonce by decrypting the nonce using a private key associated with the client device;
validating the decrypted nonce with the secret; and
in response to determining that the decrypted nonce is valid, approving the passwordless login request.

2. The apparatus of claim 1, the operations further comprising:
in response to determining that the decrypted nonce is invalid, rejecting the passwordless login request.

3. The apparatus of claim 1, the operations further comprising:
receiving, from the credential provider, an advertisement to determine the proximity of the client device;
determining, using Bluetooth Low Energy (BLE), the proximity of the client device using the advertisement;
in response to determining that the proximity of the client device is valid, validating the decrypted nonce; and
in response to determining that the proximity of the client device is invalid, rejecting the passwordless login request.

4. The apparatus of claim 1, further comprising:
storing the secret on the computing device, wherein the secret comprises a username and a login password.

5. The apparatus of claim 1, the operations further comprising:
obtaining, using the client device, the biometric authentication data by performing multi-factor authentication (MFA).

6. The apparatus of claim 1, the operations further comprising:
in response to determining the decrypted nonce is valid, releasing the secret to the credential provider; determining, using the credential provider, an autofill password by decrypting the secret.

7. The apparatus of claim 1, the operations further comprising:
validating the biometric authentication data using Transport Layer Security (TLS), certificate pinning, and request signing; and
in response to determining the biometric authentication data is invalid, rejecting the passwordless login request.

8. A computer-implemented method, comprising:
receiving, from a client device, a secret and a passwordless login request using a credential provider of the client device;
pairing the credential provider of the client device with a trusted platform module (TPM) associated with a computing device;
encrypting, using the TPM of the computing device, the secret with a hardware-bound key associated with the computing device;
receiving, from the client device, a push notification associated with the passwordless login request;
obtaining, from the client device, biometric authentication data and a nonce encrypted with a public key associated with the client device;
validating a proximity of the biometric authentication data from the client device;
determining a decrypted nonce by decrypting the nonce using a private key associated with the client device;
validating the decrypted nonce with the secret; and
in response to determining that the decrypted nonce is valid, approving the passwordless login request.

9. The computer-implemented method of claim 8, further comprising:
in response to determining that the decrypted nonce is invalid, rejecting the passwordless login request.

10. The computer-implemented method of claim 8, further comprising:
receiving, from the credential provider, an advertisement to determine the proximity of the client device;
determining, using Bluetooth Low Energy (BLE), the proximity of the client device using the advertisement;
in response to determining that the proximity of the client device is valid, validating the decrypted nonce; and
in response to determining that the proximity of the client device is invalid, rejecting the passwordless login request.

11. The computer-implemented method of claim 8, further comprising:
storing the secret on the computing device, wherein the secret comprises a username and a login password.

12. The computer-implemented method of claim 8, further comprising:
obtaining, using the client device, the biometric authentication data by performing multi-factor authentication (MFA).

13. The computer-implemented method of claim 8, further comprising:
in response to determining the decrypted nonce is valid, releasing the secret to the credential provider; determining, using the credential provider, an autofill password by decrypting the secret.

14. The computer-implemented method of claim 8, further comprising:
validating the biometric authentication data using Transport Layer Security (TLS), certificate pinning, and request signing; and
in response to determining the biometric authentication data is invalid, rejecting the passwordless login request.

15. A non-transitory computer-readable medium comprising instructions that are configured, when executed by a processor, to perform operations comprising:
receiving, from a client device, a secret and a passwordless login request using a credential provider of the client device;
pairing the credential provider of the client device with a trusted platform module (TPM) associated with a computing device;
encrypting, using the TPM of the computing device, the secret with a hardware-bound key associated with the computing device;
receiving, from the client device, a push notification associated with the passwordless login request;
obtaining, from the client device, biometric authentication data and a nonce encrypted with a public key associated with the client device;
validating a proximity of the biometric authentication data from the client device;
determining a decrypted nonce by decrypting the nonce using a private key associated with the client device;
validating the decrypted nonce with the secret; and
in response to determining that the decrypted nonce is valid, approving the passwordless login request.

16. The non-transitory computer-readable medium of claim 15, wherein the instructions are further configured to perform operations further comprising:
in response to determining that the decrypted nonce is invalid, rejecting the passwordless login request.

17. The non-transitory computer-readable medium of claim 15, wherein the instructions are further configured to perform operations further comprising:
receiving, from the credential provider, an advertisement to determine the proximity of the client device;

determining, using Bluetooth Low Energy (BLE), the proximity of the client device using the advertisement;

in response to determining that the proximity of the client device is valid, validating the decrypted nonce; and in response to determining that the proximity of the client device is invalid, rejecting the passwordless login request.

18. The non-transitory computer-readable medium of claim 15, wherein the instructions are further configured to perform operations further comprising:

storing the secret on the computing device, wherein the secret comprises a username and a login password.

19. The non-transitory computer-readable medium of claim 15, wherein the instructions are further configured to perform operations further comprising:

obtaining, using the client device, the biometric authentication data by performing multi-factor authentication (MFA).

20. The non-transitory computer-readable medium of claim 15, wherein the instructions are further configured to perform operations further comprising:

in response to determining the decrypted nonce is valid, releasing the secret to the credential provider; determining, using the credential provider, an autofill password by decrypting the secret.

* * * * *